US012192735B2

(12) United States Patent
Laitinen et al.

(10) Patent No.: US 12,192,735 B2
(45) Date of Patent: Jan. 7, 2025

(54) APPARATUS, METHODS AND COMPUTER PROGRAMS FOR REPOSITIONING SPATIAL AUDIO STREAMS

(71) Applicant: Nokia Technologies Oy, Espoo (FI)

(72) Inventors: Mikko-Ville Laitinen, Espoo (FI); Juha Tapio Vilkamo, Helsinki (FI); Jussi Kalevi Virolainen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 117 days.

(21) Appl. No.: 17/900,992

(22) Filed: Sep. 1, 2022

(65) Prior Publication Data
US 2023/0084225 A1    Mar. 16, 2023

(30) Foreign Application Priority Data

Sep. 10, 2021    (GB) ..................... 2112912

(51) Int. Cl.
*H04R 5/02* (2006.01)
*H04S 7/00* (2006.01)

(52) U.S. Cl.
CPC ..................... *H04S 7/30* (2013.01)

(58) Field of Classification Search
CPC ......................................... H04S 7/30
USPC ......................................... 381/303
See application file for complete search history.

(56) References Cited

U.S. PATENT DOCUMENTS

| 2011/0051940 | A1 | 3/2011 | Ishikawa et al. | 381/22 |
| 2015/0098571 | A1 | 4/2015 | Jarvinen et al. | 7/302 |
| 2022/0159404 | A1* | 5/2022 | Stringer | H04R 3/12 |
| 2023/0096873 | A1* | 3/2023 | Vilkamo | H04N 21/4398 381/303 |

FOREIGN PATENT DOCUMENTS

| GB | 2592610 A | 9/2021 |
| WO | WO-2010/109918 A1 | 9/2012 |
| WO | WO-2013/156818 A1 | 10/2013 |
| WO | WO-2021/048468 A1 | 3/2021 |

* cited by examiner

*Primary Examiner* — Ammar T Hamid
(74) *Attorney, Agent, or Firm* — McCarter & English, LLP

(57) ABSTRACT

Examples of the disclosure relate to apparatus, methods and computer programs for repositioning spatial audio streams. The apparatus is configured to receive a plurality of spatial audio streams wherein the spatial audio streams include one or more audio signals and associated spatial metadata. The apparatus is also configured to receive obtaining repositioning information relating to at least one of the plurality of spatial audio streams and repositioning the at least one of the plurality of spatial audio streams based on the repositioning information.

20 Claims, 4 Drawing Sheets

Figure 1:
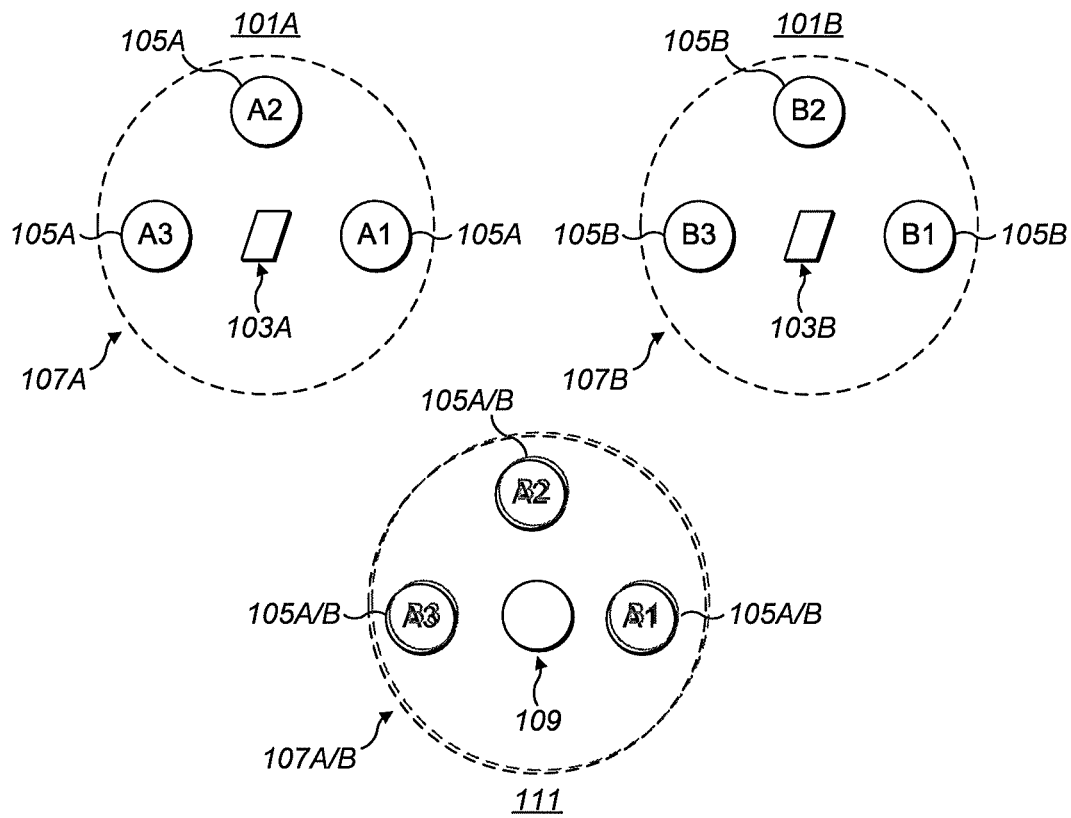

APPARATUS, METHODS AND COMPUTER PROGRAMS FOR REPOSITIONING SPATIAL AUDIO STREAMS

TECHNOLOGICAL FIELD

Examples of the disclosure relate to apparatus, methods and computer programs for repositioning spatial audio streams. Some relate to apparatus, methods and computer programs for repositioning spatial audio streams so that a user can differentiate between different audio scenes based on the repositioned spatial audio.

BACKGROUND

Spatial audio enables spatial properties of a sound scene to be reproduced for a user so that the user can perceive the spatial properties. The spatial audio could be used for teleconferencing, mediated reality content such as augmented reality and virtual reality or for any other suitable purpose.

BRIEF SUMMARY

According to various, but not necessarily all, examples of the disclosure there is provided an apparatus comprising means for:
receiving a plurality of spatial audio streams wherein the spatial audio streams comprise one or more audio signals and associated spatial metadata;
obtaining repositioning information relating to at least one of the plurality of spatial audio streams; and
repositioning the at least one of the plurality of spatial audio streams based on the repositioning information.

Repositioning the at least one of the plurality of spatial audio streams may comprise modifying at least one audio signal and modifying spatial metadata associated with the at least one audio signal.

Repositioning the at least one of the plurality of spatial audio streams may comprise;
modifying two or more of the plurality of audio signals and combining the modified audio signals;
modifying spatial metadata associated with the two or more of the plurality of modified audio signals and combining the modified spatial metadata.

The modified audio signals may be combined with one or more unmodified audio signals and the modified spatial metadata may be combined with unmodified spatial metadata.

The plurality of spatial audio streams may comprise a first audio stream captured from a first audio scene and a second audio stream captured from a second audio scene.

The repositioning of the at least one of the plurality of spatial audio streams may cause a first audio stream to be repositioned and a second audio stream to be unmodified.

The repositioning of the plurality of spatial audio streams may cause a first audio stream to be positioned in a first direction and a second audio stream to be positioned in a second direction.

The repositioning may enable a user to differentiate between the first audio stream and the second audio stream.

The repositioning information may comprise a mapping between directions of the plurality of spatial audio streams and a desired direction for the plurality of spatial audio streams.

The repositioning of the plurality of spatial audio streams may comprise repositioning the audio signals and the spatial metadata.

The repositioning of the plurality of spatial audio streams may comprise manipulating directional parameters of the spatial audio streams.

The spatial metadata may comprises, for one or more frequency sub-bands, information indicative of;
a sound direction, and sound directionality.

The repositioning of the plurality of spatial audio streams may comprise repositioning sound direction components, and sound directionality components of the spatial metadata.

The repositioning of the plurality of spatial audio streams may comprise:
determining modified directions for at least a first plurality of audio streams and a second plurality of audio streams wherein the modified directions are determined based on the repositioning information and using the modified directions to reposition sound direction components of the spatial metadata;
determining modified sound directionality parameters based on the original direct-to-total energy ratios and the repositioning information and using the modified direct to direct-to-total energy ratios to reposition sound directionality components of the spatial metadata.

The means may be for applying an energy adjustment to take into account the repositioning.

The means may be for combining the repositioned plurality of spatial audio streams.

According to various, but not necessarily all, examples of the disclosure there is provided an apparatus comprising at least one processor; and at least one memory including computer program code, the at least one memory and the computer program code configured to, with the at least one processor, cause the apparatus at least to perform:
receiving a plurality of spatial audio streams wherein the spatial audio streams comprise one or more audio signals and associated spatial metadata;
obtaining repositioning information relating to at least one of the plurality of spatial audio streams; and
repositioning the at least one of the plurality of spatial audio streams based on the repositioning information.

According to various, but not necessarily all, examples of the disclosure there is provided a teleconference system comprising one or more apparatus as described herein.

According to various, but not necessarily all, examples of the disclosure there is provided a method comprising:
receiving a plurality of spatial audio streams wherein the spatial audio streams comprise one or more audio signals and associated spatial metadata;
obtaining repositioning information relating to at least one of the plurality of spatial audio streams; and
repositioning the at least one of the plurality of spatial audio streams based on the repositioning information.

The repositioning of the at least one of the plurality of spatial audio streams may comprise modifying at least one audio signal and modifying spatial metadata associated with the at least one audio signal.

According to various, but not necessarily all, examples of the disclosure there may be provided computer program comprising computer program instructions that, when executed by processing circuitry, cause:
receiving a plurality of spatial audio streams wherein the spatial audio streams comprise one or more audio signals and associated spatial metadata;

obtaining repositioning information relating to at least one of the plurality of spatial audio streams; and
repositioning the at least one of plurality of the spatial audio streams based on the repositioning information.

BRIEF DESCRIPTION

Figure 2:
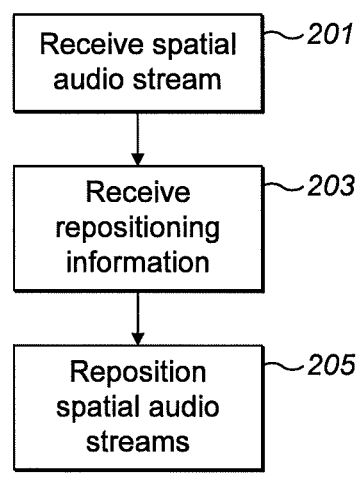
Figure 3:
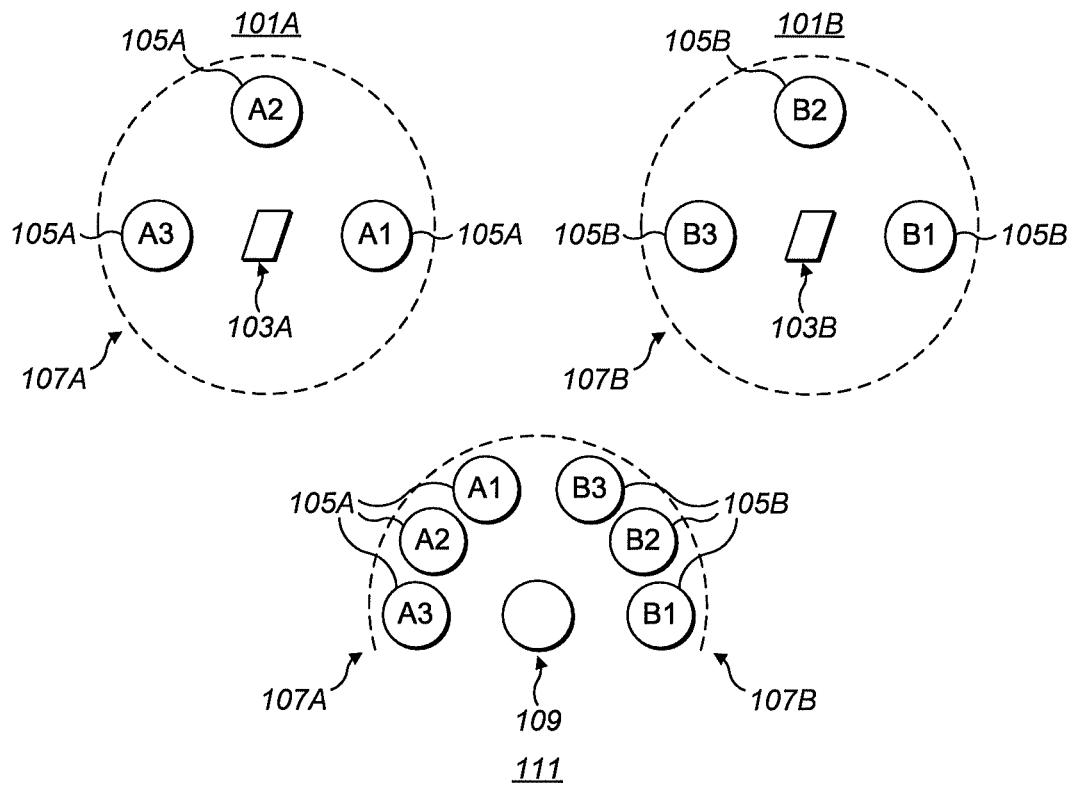
Figure 4:
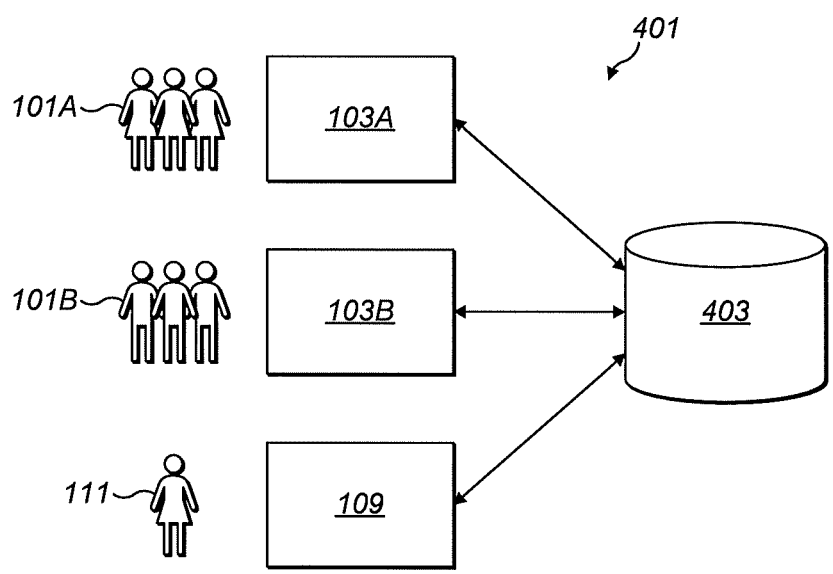
Figure 5:
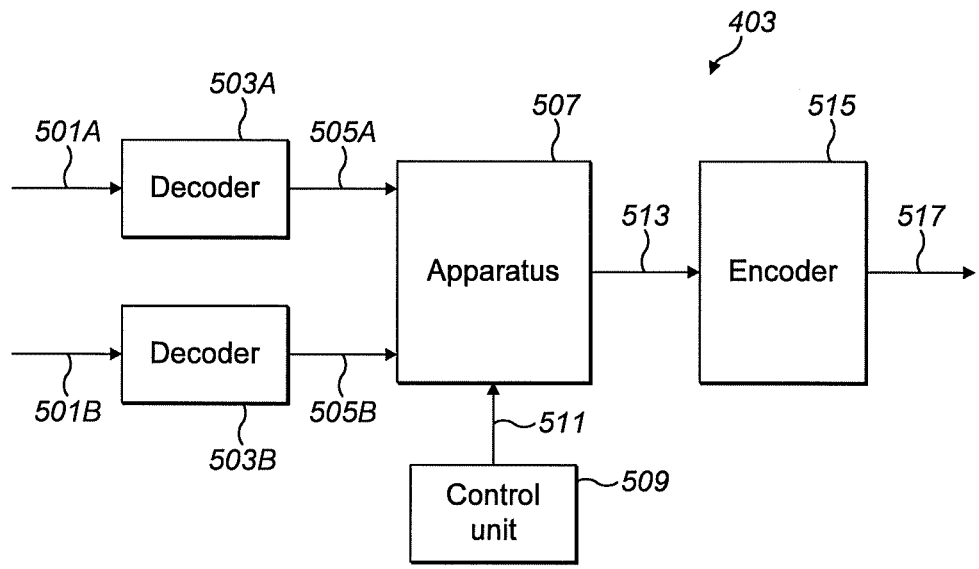
Figure 6:
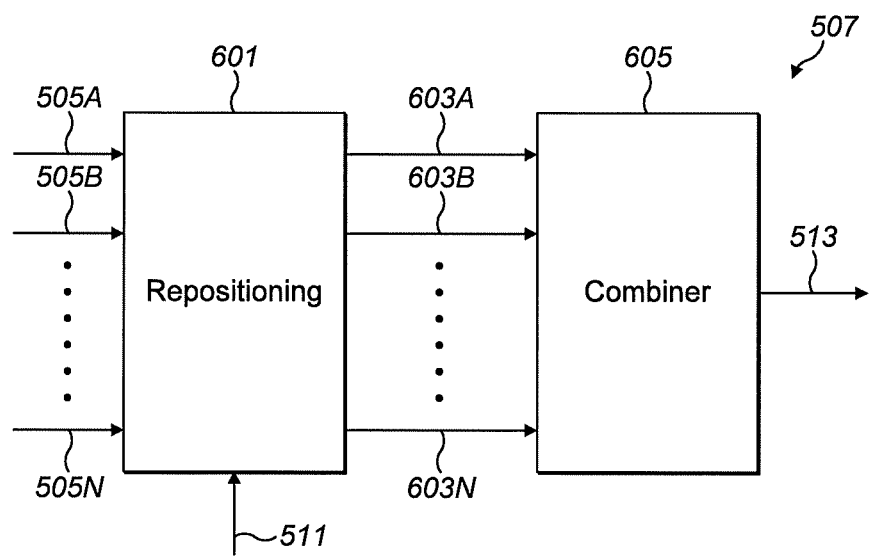
Figure 7:
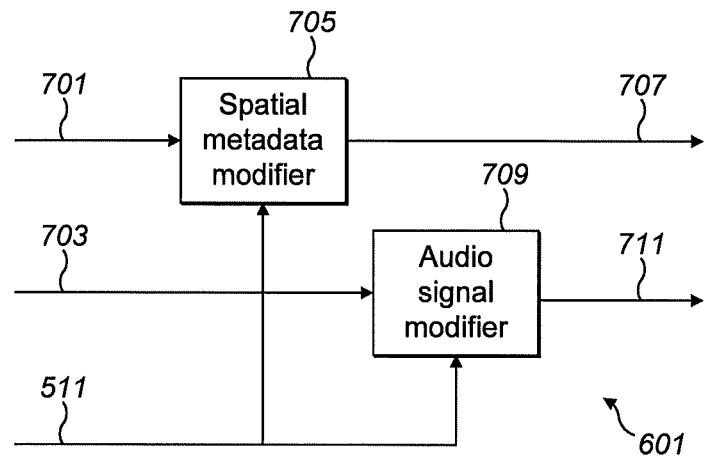
Figure 8:
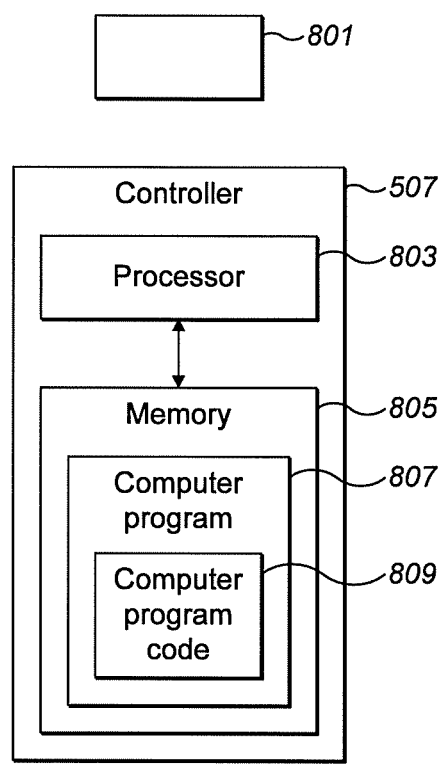

Some examples will now be described with reference to the accompanying drawings in which:
FIG. 1 illustrates example audio scenes;
FIG. 2 illustrates an example method;
FIG. 3 illustrates example audio scenes;
FIG. 4 illustrates an example system;
FIG. 5 illustrates an example server;
FIG. 6 illustrates an example apparatus;
FIG. 7 illustrates modules of an example apparatus; and
FIG. 8 illustrates a processing apparatus.

DETAILED DESCRIPTION

Examples of the disclosure relate to apparatus, methods and computer programs for repositioning spatial audio streams. The spatial audio streams that are used can comprise both audio signals and associated spatial metadata. The spatial audio streams can be obtained from different audio scenes and/or from different capture devices. The repositioning of the spatial audio streams could be used in teleconference systems such as voice conference systems, mediated reality systems or any other suitable spatial audio systems. The repositioning of the spatial audio streams can enable a user to distinguish between the audio captured from the different audio scenes based on the new positions.

FIG. 1 schematically illustrates a plurality of example audio scenes 101 and how these would be played back to a user in systems without examples of the disclosure. The example of FIG. 1 comprises a first audio scene 101A and a second audio scene 101B. The different audio scenes 101A, 101B can be at different locations. For example, where the system is being used for teleconferencing the first audio scene 101A could be in a first geographic location and the second audio scene 101B could be in a second different geographic location. The different geographic locations could be different rooms, buildings, towns, countries or any other suitable different locations. Two different locations are shown in FIG. 1 but any number of different locations could be used in other examples of the disclosure.

The different audio scenes 101A, 101B can be captured by different capture devices 103A, 103B so that a first capture device 103A captures the first audio scene 101A and a second capture device 103B captures the second audio scene 101B. The first capture device 103A and the audio capture device 103B can be independent of each other.

The capture devices 103A, 103B can comprise any devices that can be configured to capture spatial audio. The capture devices 103A, 103B can comprise a plurality of microphones or one or more microphone arrays. The capture devices 103A, 103B can be configured to enable spatial information relating to the audio scenes 101A, 101b to be captured. The capture devices 103A, 103B can be part of a teleconferencing system, used to capture mediated reality or used for any other suitable system.

The signals captured by the capture devices 103A, 103B can be processed to provide spatial audio streams.

In the example of FIG. 1 the first audio scene 101A comprises three sound sources 105A and ambient sounds 107A. The sound sources 105A are distributed throughout the sound scene 101A. The sound sources 105A are located in different positions within the sound scene 101A. The sound sources 105A can be fixed in position within the sound scene 101 or can be moveable within the audio scene 101A. In some examples the sound sources 105A that are comprised within the audio scene 101A can change as sound sources 105A move in and out of the audio scene 101A.

The second sound scene 101B also comprises three sound sources 105B and ambient sounds 107B. The sound sources 105B in the second sound scene 101B can also be fixed or moveable and can be located within any suitable location within the second sound scene 101B.

In the example of FIG. 1 both of the first sound scene 101A and the second sound scene 101B comprises three sound sources 105A, 105B. In other examples the sound scenes 101A, 101B can comprise different numbers of sound sources 105A, 105B. In some examples the first sound scene 101A can comprise a different number of sound sources 105A to the second sound scene 105B.

The sound sources 105A, 105B can comprise any suitable sound sources. In some examples the sound sources 105A, 105B could comprise people talking. Other types of sound sources 105A, 105B could be used in other examples of the disclosure.

The spatial audio streams are transmitted to the playback device 109. The playback device 109 can be located at a third location 111 which is different to both the first location and the second locations.

The playback device 109 can be configured to process the received spatial audio streams to playback spatial audio for a user. In the example shown in FIG. 1 the examples of this disclosure are not used. The spatial audio can comprise both ambient components and directional components. The directional components can be based on the positions of the respective sound sources 105A, 105B.

The playback device 109 can also be configured to enable audio processing of the received spatial audio streams for use in real time communications. The audio processing could comprise acoustic echo cancellation, noise suppression, automatic gain control and/or any other suitable processing.

In the example of FIG. 1 the played pack spatial audio has the first sound sources 105A and the second sound sources 105B reproduced in positions that correspond to their positions within the respective audio scenes 101A, 101B. This can be confusing and/or disorientating for a user of the playback device 109. In the example of FIG. 1 this is shown as the first sound sources 105A overlapping with the second sound sources 105B. The ambient sounds 107A, 107B are provided so that they appear to surround the user and so would also be reproduced so that they overlap each other. This can make it difficult for a user to distinguish between sound sources 105A from the first audio scene 101A and sound sources 101B from the second audio scene 101A. This can be confusing and disorientating for a user.

FIG. 2 illustrates an example method that can be used in examples of the disclosure to enable audio streams to be repositioned. The method can be performed by any suitable apparatus. In some examples the method could be performed by an apparatus within a teleconferencing system or a mediated reality system or any other suitable system. For instance, the method could be performed by a server or any other suitable apparatus. In some examples the apparatus could be provided within a user device such as a playback device that processes the spatial audio streams to enable the spatial audio to be played back to a user.

The method comprises, at block 201 receiving a plurality of spatial audio streams. The spatial audio streams comprise both audio signals and associated spatial metadata. The spatial audio streams can comprise one or more audio signals. The audio signals and the associated spatial metadata can be provided in the same spatial audio stream. The audio signals can comprise an audio channel.

The audio signals can comprise transport audio signals. The audio signals can comprise microphone-based signals. The audio signals can comprise processed microphone signals or any other suitable type of signals.

The spatial metadata can be associated with the audio signals in that the spatial metadata relates to the same audio scene that can be represented by the audio signals. The information used for the audio signals and the information used for the spatial metadata can be captured at the same time.

The spatial metadata can comprise any data obtained from the audio scenes 101A, 101B that expresses the spatial features of the audio scenes 101A, 101B. For example, the spatial metadata could comprise one or more of the following: direction parameters, direct-to-total ratio parameters, diffuse-to-total ratio parameters, spatial coherence parameters (indicating coherent sound at surrounding directions), spread coherence parameters (indicating coherent sound at a spatial arc or area), direction vector values and any other suitable parameters expressing the spatial properties of the spatial sound distributions.

In some examples the spatial metadata can comprise information indicative of a sound direction and a sound directionality. The sound directionality can indicate how directional or non-directional/ambient the sound is. This spatial metadata could be a direction-of-arriving-sound and a direct-to-total ratio parameter. The parameters of the spatial metadata can be provided in frequency bands. Other parameters could be used in other examples of the disclosure.

The plurality of spatial audio streams can comprise audio streams captured from different audio scenes 101. For example, the plurality of spatial audio streams can comprise a first audio stream captured from a first audio scene 101A and a second of audio stream captured from a second audio scene 101B. The first audio scene 101A and the second audio scene 101B can comprise different sound sources 105A, 105B and be located at different geographic locations. The audio streams can comprise one or more audio signals.

The audio scenes 101A, 1018 can comprise omnidirectional audio scenes. The audio scenes 101A, 1018 can comprise sounds from a range of directions. The audio scenes 101A, 101B can also comprise ambient sounds 107A, 107B.

At block 203 the method comprises obtaining repositioning information relating to the plurality of spatial audio streams. The repositioning information can comprise information that can be used to process the spatial audio streams to enable them to be repositioned. The repositioning information can comprise information indicative of a new position for each of the spatial audio streams. In some examples the repositioning information can comprise a mapping between directions of the plurality of spatial audio streams and a desired direction for the plurality of spatial audio streams.

In some examples the repositioning information can be pre-determined or can be determined without any user input. For example, the apparatus can be configured so that each of the plurality of spatial audio streams is repositioned into an angular section. Each of the angular sectors could have the same width so that the width of the sectors is determined by the number of data audio streams that is received. The position of the angular sector can be assigned to the spatial audio stream based on the order in which the spatial audio streams are received or any other suitable factor.

In some examples the repositioning information can, at least in part, be determined by a user of the playback device 109 or of a user of any other part of the system. For instance, a user of the playback device 109 could indicate a preferred order of preference for particular spatial audio streams and could assign these spatial audio streams a larger angular section or a preferred position.

At block 205 the method comprises repositioning the plurality of spatial audio streams based on the repositioning information. The repositioning of the plurality of spatial audio streams can comprise repositioning both the audio signals and the associated spatial metadata. The repositioning of the plurality of spatial audio streams can comprise processing the audio signals and the associated spatial metadata so that the audio sources and/or ambience of the spatial audio streams are perceived to be at a different position. The repositioning of the plurality of spatial audio streams can comprise repositioning both the audio signals and the associated spatial metadata in each of the plurality of spatial audio streams. In some examples the repositioning could comprise repositioning just a subset of the plurality of spatial audio streams.

The repositioning the at least one of the plurality of spatial audio streams can comprise modifying at least one audio signal and modifying spatial metadata associated with the at least one audio signal and combining the modified at least one audio signal and associated modified spatial metadata. In some examples the repositioning of the at least one of the plurality of spatial audio streams can comprise modifying a plurality of audio signals and combining the modified plurality of audio signals, modifying spatial metadata associated with the plurality of modified audio signals and combining the modified spatial metadata, and combining the modified plurality of audio signals and associated modified spatial metadata.

In some examples only a subset of the plurality of spatial audio streams might be modified or repositioned. In such examples the modified spatial audio signals can be combined with unmodified spatial audio signals and the modified spatial metadata can be combined with unmodified spatial metadata.

The repositioning can comprise manipulating directional parameters of the spatial audio streams. The repositioning can comprise manipulating the spatial properties of both the audio signals and the associated spatial metadata. The manipulating of the spatial properties can comprise any suitable processing of the respective properties.

The repositioning of the plurality of spatial audio streams can comprise repositioning the respective components of the spatial metadata. For instance, where the spatial metadata comprises a sound direction component and a sound directionality component both of these components could be adjusted or repositioned.

In such examples the repositioning of the spatial audio streams can comprise determining modified directions for at least a first set of the plurality of audio streams and a second set of the plurality of audio streams. The modified directions can be determined based on the repositioning information. The modified directions can then be used to reposition the audio signals and the sound direction components of the spatial metadata. The repositioning of the spatial audio streams can also comprise determining modified sound directionality parameters based on the original direct-to-total energy ratios and the repositioning information. The modified direct-to-total energy ratios can then be used to adjust the spatialization of the ambient components within the spatial audio streams.

The repositioning of the plurality of spatial audio streams causes a first set of the audio streams to be positioned in a first set of directions and a second set of audio streams to be positioned in a second set of directions. For example, sound sources 105A in the first audio stream can be relocated to an angular section in a first direction and sound sources 105B in the second audio stream can be relocated to an angular section in a second direction. The repositioning of the sound sources 105A, 105B to the different directions can enable a user to differentiate between the first audio stream and the second audio stream. For instance, this could enable a user to differentiate between different speakers at different locations or it could enable a user to differentiate between different mediated reality sound objects.

In some examples the method can comprise steps that are not shown in FIG. 2. For instance, in some examples an energy and/or spectral adjustment can be applied to the repositioned spatial audio streams. The energy and/or spectral adjustment can be configured to take the repositioning into account.

In some examples the method can comprise combining the repositioned plurality of spatial audio streams FIG. 3 illustrates example audio scenes 101A and 101B. The first audio scene 101A and the second audio scene 101B can be as shown in FIG. 1 and described above.

In the example of FIG. 3 the method shown in FIG. 2 has been implemented to reposition the audio streams. The audio streams have been repositioned so that the playback of the sound sources 105A and the ambient sound 107A from the first audio scene 101A do not overlap with the playback of the sound sources 105B and the ambient sound 107B from the second audio scene 101B. In this example the capture of the audio scenes 101A, 101B is the same as shown in FIG. 1. However, the playback is different because examples of the disclosure are used to reposition the spatial audio streams.

In this example the sound sources 105A and the ambient sound 107A from the first audio scene 101A have been repositioned so that they appear to the left-hand side of the user. The sound sources 105B and the ambient sound 107B from the second audio scene 101B have been repositioned so that they appear to the right-hand side of the user. In other examples the respective sound sources 105A, 105B and ambient sound 107A, 107B could be repositioned to different locations.

In the example of FIG. 3 the different sound sources 105A from the first audio scene 101A are each repositioned to different locations. The different locations are each within an angular range of the user. For instance, in the example of FIG. 3 each of the sound sources 105A from the first audio scene 101A are positioned to the left-hand side of the user but are positioned so that they do not appear to be overlapping. This can enable a user to distinguish between the sound sources 105A from the first audio scene 101A based on the repositioned locations. The ambient sounds 107A from the first audio scene 107A has also been repositioned so that it only appears at the left-hand side of the user.

Similarly, the different sound sources 105B from the second audio scene 101B are each repositioned to different locations. The different locations for the second audio scene 101B are also within an angular range of the user. The angular range for the second audio scene 101B is different to the angular range for the first audio scene 101A. The angular range for the second audio scene 101B does not overlap with the angular range from the first audio scene 101A. In the example of FIG. 3 each of the sound sources 105B from the second audio scene 101B are positioned to the right-hand side of the user but are positioned so that they do not appear to be overlapping. This can enable a user to distinguish between the sound sources 105B from the first audio scene 101B based on the repositioned locations. The ambient sounds 107B from the first audio scene 107B have also been repositioned so that it only appears at the right-hand side of the user.

In the example of FIG. 3 the spatial audio from the first audio scene 101A is provided between an angular range of 10 to 90 and the second audio scene 101B is provided between an angular range of −10 to −90 degrees. Other angular ranges could be used in other examples of the disclosure. In this example each of the angular ranges have the same width. In other examples the sector for the respective audio scenes 101 could have different widths.

In the example of FIG. 3 the sound sources 105A, 105B and ambient sound 107A, 107B from two audio scenes 101A, 101B have been repositioned. In other examples there could be more than two audio scenes 101 that could provide spatial audio streams to be repositioned. In such examples each of the spatial audio streams from the different audio scenes 101 could be repositioned so that the sound sources 105 and ambient sound 107 from each of the audio scenes 101 are rendered at different positions. The different positions could comprise different angular ranges relative to the user. The different positions could comprise non-overlapping angular ranges.

FIG. 4 illustrates an example system 401 that could be used to implement examples of the disclosure. In this example the system 401 is used to enable a voice conference session. The system 401 comprises a plurality of capture devices 103A, 103B and playback devices 109 and a server 403. Each of the capture devices 103A, 103B could also function as a playback device for the other participants in the voice conference session.

The system 401 can comprise any suitable number of capture devices 103. Each of the capture devices can comprise a plurality of microphones. The plurality of microphones within the capture devices 103 can be configured to enable the capture device 103 to capture spatial audio.

In the example of FIG. 4 the system 401 comprises a first capture device 103A and a second capture device 103B. The first capture device 103A is located in a first location and configured to capture spatial audio from a first audio scene 101A. The second capture device 103B is located in a second location and configured to capture spatial audio from a second audio scene 101B.

In the example of FIG. 4 each of the first audio scene 101A and the second audio scene 101B comprise a plurality of sound sources. In other examples of the disclosure the sound scenes 101A, 101B can comprise any number of sound sources and do not need to comprise a plurality of sound sources.

In the example of FIG. 4 the different audio scenes 101A, 101B each comprise three people who could be speaking during the voice conference session. The different people could be positioned in any locations within the audio scenes 101A, 101B. In some examples the people could be moving around within the audio scenes 101A, 101B or they could be in fixed positions.

The capture devices 103A, 103B are configured to process the captured spatial audio to generate spatial audio streams. The spatial audio streams comprise audio signals and associated spatial metadata. The audio signals could comprise transport audio signals, processed microphone signals, or any other suitable type of signals. The audio signals can comprise captured audio signals that have been processed based on the microphone signals into a format that is suitable for transmission by the capture device 103A, 103B. For example, generating an audio signal based on microphone signals could involve beamforming, microphone noise reduction, ambient noise reduction, automatic gain control, limiter, speech enhancement, audio coding, and/or any other suitable procedures. The audio signal can be transmitted from the capture devices 103A, 103B to the server 403.

The spatial metadata can be transmitted with the audio signals. The spatial metadata can be associated with the audio signals. The spatial metadata can comprise any data that expresses the spatial features of the audio scenes 101A, 1018. The spatial metadata can be transmitted in a quantized and encoded form.

The server 403 can be positioned in a different location to the first capture device 103A and the second capture device 103B. The server 403 can be configured to receive the plurality of spatial audio streams from the capture devices 103A, 103B using any suitable communications protocols. The sever 403 can be configured to receive the plurality of spatial audio streams from the capture devices 103A, 103B using wired and/or wireless communication links.

The server 403 can comprise a processing apparatus 507. The processing apparatus 507 can be as shown in FIG. 8 or in any other suitable format. The processing apparatus 507 can be configured to receive the plurality of spatial audio streams from the capture devices 103A, 103B and process the receive the plurality of spatial audio streams to reposition them. The server 403 can use methods as shown in FIG. 2, or any other suitable methods, to reposition the spatial audio streams.

The server 403 can also be configured to combine the repositioned spatial audio streams. The repositioned spatial audio streams can be combined into a single signal or any other suitable format. The repositioned spatial audio streams can be combined and transmitted to the playback device 109.

The playback device 109 can comprise any device that enable spatial audio to be processed and played back for a user. In some examples the playback device 109 can comprise a stereo head set that enables binaural playback. In other examples the playback device could comprise a loudspeaker arrangement or any other suitable device that enable spatial audio to be played back to a user.

In the example of FIG. 4 the stereo headset can be configured to provide the played back audio to a single user. In other examples a plurality of headsets could be used to enable the repositioned spatial audio to be played back to a plurality of users.

The spatial audio can be processed by the playback device 109 before it is played back to the user. The spatial audio can be played back so that the repositioned first audio scene 101A is provided at a first position and the repositioned second audio scene 101B is provided at a second, different position. For instance, the spatial audio can be repositioned so that sound sources 105A from the first audio scene 101A are located on the left-hand side for the user of the playback device 109 and sound sources 105B from the second audio scene 101B are located on the right-hand hand side for the user of the playback device 109.

FIG. 5 schematically illustrates an example server 403 that could be used in some examples of the disclosure.

The server 403 receives a first encoded spatial audio stream 501A and a second encoded spatial audio stream 501B. The first encoded spatial audio stream 501A can comprise audio signals and associated spatial metadata from a first audio scene 101A and the second encoded spatial audio stream 501B can comprise audio signals and associated spatial metadata from a second audio scene 101B.

The encoded spatial audio streams 501A, 501B can be received from spatial audio capture devices 103A, 103B. The encoded spatial audio streams 501A, 501B can be received independently of each other.

The first encoded spatial audio stream 501A is provided to a first decoder 503A. The first decoder 503A decodes the first encoded spatial audio stream 501A to provide a first decoded spatial audio stream 505A. Similarly, the second encoded spatial audio stream 501B is provided to a second decoder 503B. The second decoder 5036 decodes the second encoded spatial audio stream 501B to provide a second decoded spatial audio stream 505B. Any suitable processes can be used to decode the respective encoded spatial audio streams 501A, 501B. The processes that are used to decode the encoded spatial audio streams 501A, 501B can be dependent upon the processes that were used to encode the encoded spatial audio streams 501A, 501B.

Both of the decoded spatial audio streams 505A, 505B are provided to the apparatus 507. The apparatus 507 can be a processing apparatus or any other suitable type of apparatus 507. An example apparatus 507 is shown in FIG. 8.

The apparatus 507 also obtains repositioning information 511 as an input. The repositioning information can be received from a control unit 509 or any other suitable entity. The control unit 509 can be configured to determine the desired positions of the spatial audio scenes 101A, 101B. For example, the control unit 509 can be configured to determine where the spatial audio scenes 101A, 101B should be repositioned to in order to enable a user to distinguish between the different audio scenes 101A, 101B. The control unit 509 can be configured to determine the angular positions and angular ranges to which the spatial audio scenes 101A, 101B should be repositioned.

In some examples the control unit 509 can define the new positions for the spatial audio scenes 101A, 101B based on the number of parties within the voice conferencing session, the number of spatial audio streams received and/or any other suitable factor. In some examples the spatial audio scenes 101A, 101B can be positioned based on the order in which the users at the respective locations joined the voice conference session. For example, if a new spatial audio scene 101 joins the session, the control unit 509 can define a new sector which will be placed to the right side of the user of the playback device 109. The sector widths of the current spatial audio scenes 101A, 101B can be compressed and/or sector positions can be altered to make space for the new sector. In such cases the re-positioning of the spatial audio scenes 101A, 101B can be performed automatically without any input from a user.

In some examples the control unit 509 could reposition spatial audio in positions indicated as preferred by a user. For instance, a user could make an input that indicates that they prefer a first audio scene 101A to be always on the right-hand side and a second audio scene to be always on the left-hand side or the user could select the audio to be positioned to correspond to the positions of video images obtained from the respective capture devices 103A, 103B. For instance, if video images corresponding to the first audio scenes 101A are displayed on the right-hand side of a user's display they can select the audio from the first audio scene 101A to also be provided to their right-hand side.

The control unit 509 can use information relating to the current positions of sound sources 105A, 105B within the audio scenes 101A, 101B and the information relating to the desired new positions and use this information to determine the repositioning information. The repositioning information 511 could comprise a mapping between the directions of the sound sources 105A, 105B in the spatial audio streams and the desired direction of the spatial audio streams and/or any other suitable information.

The apparatus 507 uses the repositioning information 511 to reposition the decoded spatial audio streams 505A, 505B. The apparatus 507 can also be configured to combine the repositioned decoded spatial audio streams 505A, 505B so as to provide a combined and repositioned spatial audio stream 513 as an output.

The combined and repositioned spatial audio stream 513 is provided to an encoder 515. The encoder 515 encodes the combined and repositioned spatial audio stream 513 to provide an encoded combined and repositioned spatial audio stream 517 as an output. The encoded combined and repositioned spatial audio stream 517 can be transmitted to a playback device 109 to enable the playback device to provide the repositioned spatial audio to a user.

It is to be appreciated that the example of FIG. 5 is schematic and that different combinations and configurations of the respective modules could be used in examples of the disclosure. For instance, the decoders 503A, 503B and/or the encoder 515 could be provided as part of the apparatus 507.

FIG. 6 illustrates processes that can be performed by an example apparatus 507.

The apparatus 507 receives a plurality of spatial audio streams 505A-505N as an input. The spatial audio streams 505A-505N can be decoded before they are provided to the apparatus 507 as shown in FIG. 6.

The spatial audio streams 505A-505N can comprise any suitable type of spatial audio. In some examples the spatial audio streams 505A-505N can comprise parametric spatial audio streams. The spatial audio streams 505A-505N can be captured using any suitable spatial audio capture device 103A-103N. In some examples the spatial audio streams 505A-505N can be captured using mobile devices such as mobile phones or any other suitable type of device. Different audio capture devices 103A-103N can be used to capture each of the spatial audio streams 505A-505N. the different audio capture devices 103A-103N can be located in different locations so as to enable different audio scenes 101A-101N to be captured.

The captured audio can be processed using any suitable technique to provide the spatial audio streams 505A-505N. The spatial audio streams 505A-505N can be encoded before they are transmitted to the server 403. The spatial audio streams 505A-505N can be encoded using any suitable encoding process. In some examples the spatial audio streams 505A-505N can be encoded using IVAS (Immersive Voice and Audio Services).

The spatial audio streams 505A-505N can be transmitted from the different audio capture devices 103A-103N to the server 403. The spatial audio streams 505A-505N can be transmitted using the MASA (Metadata-assisted Spatial Audio) format or any other suitable format.

In the example shown in FIG. 6 the spatial audio streams 505A-505N may have been decoded by the server 403 so that the spatial audio streams 505A-505N are decoded spatial audio streams 505A-505N.

Each of the spatial audio streams 505A-505N comprises one or more audio signals and associated spatial metadata.

The spatial metadata can comprise any data that expresses the spatial features of the audio scenes 101A-101N that have been captured by the capture devices 103A-103N. The spatial metadata can comprise spatial information relating to the audio within the audio signals.

The input spatial audio streams 505A-505N are provided to a repositioning module 601. The repositioning module 601 also obtains repositioning information 511. The repositioning information 511 can be obtained from a control unit 509 or from any other suitable source. The control unit 509 can be provided within the server 403 or within any other suitable entity.

The repositioning information 511 can comprise information that can be used to process the spatial audio streams to enable them to be repositioned. In some examples the repositioning information 511 can comprise a mapping between directions of the plurality of spatial audio streams and a desired direction for the plurality of spatial audio streams. The repositioning information 511 can be provided in any suitable format. In some examples the repositioning information 511 can comprise an angular range for the spatial audio streams 5051-505N. For instance, the repositioning information 511 could indicate that a first audio stream 505A is to be positioned between 30-90 degrees and a second audio stream 505B is to be positioned between 90 and 120 degrees. In some examples an angular range can be defined for each of the received spatial audio streams 5051-505N. The defined angular ranges can be partially overlapping or non-overlapping.

The repositioning module 601 repositions the audio content of each spatial audio stream 505A-505N based on the repositioning information 511. The repositioning module 601 provides a plurality of repositioned spatial audio streams 603A-603N as an output.

The repositioning module 601 can reposition both the direct components and the ambient components of the spatial audio streams 505A-505N. The repositioned spatial audio streams 603A-603N can therefore comprise both direct and ambient components.

In the example of FIG. 6 the number of repositioned spatial audio streams 603A-603N is the same as the number of spatial audio streams 505A-505N that are received as an input. In this example each of the output repositioned spatial audio streams 603A-603N correspond to an input spatial audio stream 505A-505N.

The repositioned spatial audio streams 603A-603N are provided as an input to a combiner module 605. The combiner module 605 combines the plurality of repositioned spatial audio streams 603A-603N into a single combined and repositioned spatial audio stream 513. Any suitable technique or process can be used to combine the plurality of repositioned spatial audio streams 603A-603N. The combiner module 605 can apply levelling and gain control functions or any other suitable processing.

The combined and repositioned spatial audio stream 513 is provided as the output of the apparatus 507. The combined and repositioned spatial audio stream 513 comprises the plurality of repositioned spatial audio streams 603A-603N. The combined and repositioned spatial audio stream 513 comprises both the direct and ambient components of the plurality of repositioned spatial audio streams 603A-603N.

The combined and repositioned spatial audio stream 513 can be encoded and transmitted to a playback device 109 to enable the repositioned spatial audio to be played back for a user. When the repositioned spatial audio is played back for a user it is easier for a user to distinguish between the different audio scenes because they are all provided within different angular ranges. This also provides a stable output in which the sound sources do not fluctuate between different locations.

FIG. 7 schematically illustrates an example repositioning module 601 of an example apparatus 507. In this the process is shown for a single input spatial audio stream 505. The same, or similar process, would be applied to each of the N received spatial audio streams 505A-505N.

The repositioning module 601 receives spatial audio streams 505A-505N as an input. The spatial audio streams 505A-505N comprise spatial metadata 701 and audio signals 703. The spatial metadata 701 and audio signals 703 can be provided as separate inputs to the repositioning module 601.

The spatial metadata 701 can comprise any information that expresses the spatial features of the audio scenes 101 captured by the spatial audio streams 505.

In this example the spatial metadata 701 comprises MASA metadata. The MASA metadata comprises direction (azimuth θ(k,n) and elevation φ(k,n)), direct-to-total energy ratio r(k,n), spread coherence ξ(k,n), and surround coherence γ(k,n) parameters in time-frequency domain (k is the frequency band index and n the temporal frame index).

The audio signals 703 can comprise any number of audio signals. In this example the audio signals 703 comprise two audio signals.

The spatial metadata 701 is provided as an input to a spatial metadata modifier module 705. The audio signals 703 are provided as an input to an audio signal modifier module 709.

The repositioning module 601 also receives repositioning information 511 as an input. The repositioning information 511 can be provided in any suitable format. In this example the repositioning information 511 is provided as an angular span [$\alpha_{left}$, $\alpha_{right}$] (in azimuth direction) within which the input spatial audio stream 505 should be re-positioned in. In this example the repositioning occurs at the azimuth axis, however, similar principles could be employed to also reposition within the elevation axis. In such cases, the reposition information could include also an elevation angular span and/or any other suitable information.

The repositioning information 511 can be provided as an input to both the spatial metadata modifier module 705 and the audio signal modifier module 709.

The spatial metadata 701 of the first spatial audio stream 505 is provided to the spatial metadata modifier module 705. The spatial metadata modifier module 705 repositions the spatial metadata 701 based on the repositioning information 511.

As an example, let us assume that the angular span for the first spatial audio stream 505 is [90, 30] degrees. In order to reposition the spatial metadata 701 both the directions and the sound directionality parameters are repositioned.

The directions can be repositioned as followed. In this example the elevations are not modified. The elevations are simply outputted as they are (i.e., $\phi_{mod}(k,n)=\phi(k,n)$). Conversely, the azimuths are modified based on the repositioning information 511.

In this example it is assumed that the capture device 103 that has been used to capture the spatial audio stream 505 is a mobile device such as a mobile phone or other similar type of device. Other types of capture device 103 could be used in other examples.

In this example the capture device 103 has been used to capture a teleconference so that the participants that provide the sound sources 105 are mainly positioned on the front side of the capture device 103.

Using these assumptions, the re-mapping of the azimuth angles can be done as follows. First, the back directions are mirrored to front if θ(k,n)>90°, θ'(k,n)=180°−θ(k,n)

else if θ(k,n)<−90°, θ'(k,n)=−180°−θ(k,n)

else, θ'(k,n)=θ(k,n)

Then, the center direction of the angular span is computed $$\alpha_{center} = \frac{\alpha_{left} + \alpha_{righ}}{2}$$

and the width of the angular span is computed $$\alpha_{width} = \frac{|\alpha_{left} - \alpha_{right}|}{2}$$

Using these variables, the modified azimuth angles can be computed as $$\theta_{mod}(k, n) = \frac{\theta'(k, n)\alpha_{widt}}{180°} + \alpha_{center}$$

This modification maps the input azimuth angles to the desired angular span as indicated in the repositioning information 511. This enables the playback device 109 to render the spatial audio stream within this angular span.

Examples of the disclosure also enable the sound directionality parameters of the spatial metadata 701 to be modified. In this example the sound directionality parameters comprise direct-to-total energy ratios.

If the direct-to-total energy ratios are not modified then this would cause the ambient sounds 107 to be rendered to all directions. This could be confusing for a user of the playback device.

The direct-to-total energy ratios can be modified by making the values larger the smaller angular span is. For example, the following modification can be performed $$r_{mod}(k, n) = 1 - \frac{(1 - r(k, n))\alpha_{width}}{180°}$$

This modification enables the ambient sounds 107 be rendered within the target angular span or substantially within the target angular span.

The spread coherences can also be modified in order to match the change in the width of the angular span. For example, the following modification can be performed $$\xi_{mod}(k, n) = \frac{\xi(k, n)\alpha_{width}}{180°}$$

The surround coherences can be passed unmodified (that is, $\gamma_{mod}(k,n)=\gamma(k,n)$).

These modifications performed by the spatial metadata modifier module 705 provide modified spatial metadata 707 as an output. In this example the modified spatial metadata comprises the parameters $\theta_{mod}(k,n)$, $\phi_{mod}(k,n)$, $r_{mod}(k,n)$, $\xi_{mod}(k,n)$, and $\gamma_{mod}(k,n)$.

The audio signals 703 of the first spatial audio stream 505 are provided to the audio signal modifier module 709. The audio signal modifier module 709 repositions the audio signals 703 based on the repositioning information 511 to provide repositioned audio signals 711 as an output.

The audio signals 703 can be repositioned using the following process or any other suitable process.

To begin the process, if the audio signals 703 are in a time-domain, they are converted to a time-frequency representation. Any suitable filter bank can be used to convert the audio signals 703 from the time-domain to a time-frequency representation. For instance, the filter bank could comprise a complex-modulated quadrature mirror filter (QMF) bank, or a low-delay variant thereof. In example where the filter banks are used the repositioning module 601 can be configured to delay the spatial metadata 701 to account for the delay of the forward and inverse filter banks. In other example the audio signals 703 could be received in a time-frequency domain. In such examples no conversion or filter bank would be used.

To reposition the audio signals 703, a re-panning value p is determined for the audio signals 703 based on the angles $\alpha_{left}$, $\alpha_{right}$ by $$p = \max\left(-1, \min\left(1, \frac{\alpha_{left} + \alpha_{right}}{\alpha_{width}}\right)\right)$$

For stereo audio signal, a re-panning matrix P, assuming positive angles at left side and channel order as left-right, is determined by $$P = \begin{bmatrix} \min(1, 1+p) & \max(0, p) \\ \max(0, -p) & \min(1, 1-p) \end{bmatrix}$$

The time-frequency signals are denoted as a column vector s(b, t) where b is the frequency bin index and t is the time index and the row is the channel. The repositioning is performed by s'(b,t)=Ps(b,t)

The signal s'(b,t) is then the repositioned audio signal in time-frequency domain before equalization.

An energy adjustment can be applied to the signal to take the repositioning into account. The signal can be equalized so that signal s'(b,t) has the same combined energy spectrum over the channels as signal s(b, t), with suitable temporal averaging, and suitable avoidance of excessive signal amplifications (for example maximum amplification of 6 dB).

If a forward filter bank was applied then a corresponding inverse filter bank is applied to convert the signal back to the time-domain signal.

The result of this process is a repositioned audio signal 711 that is provided as an output from the audio signal modifier module 709.

Variations to this process can be used in examples of the disclosure. For instance, if the input audio signals comprise only one channel, then the panning matrix can be replaced with a panning vector to generate a panned stereo audio signal by $$P = 0.5 \begin{bmatrix} \max(0, 1+p) \\ \max(0, 1-p) \end{bmatrix}$$

In this example the signals are provided in a time-frequency domain or are converted to a time-frequency domain. In some examples, the signals could be processed as time-domain signals. This could be used in cases where a smaller delay is needed as it can avoid delays caused by the use of the filter banks.

In such cases the equalization as described above would not be applied, but instead no equalization, or static or time-varying FIR (Finite Impulse Response) or IIR (Infinite Impulse Response) equalization would be performed. In some examples the audio signals 703 can be in a form related to an audio codec, such as in a MDCT (Modified Discrete Cosine Transform) form or any other suitable form.

In some embodiments, the repositioning information 511 could also include distance information for the spatial audio streams. For example, a certain party may be positioned not only to a certain angular span, but also further or nearer than other parties. The distance information could for example be a relative parameter where value 1 represents no change of distance, value 2 double the distance, value 0.5 half the distance, and so forth. An example way to modify the distance of a spatial audio stream is to multiply the corresponding reposition matrix P by a value $1/d_r$ where $d_r$ is the relative distance parameter.

In further examples related to distance processing, the audio signals can be decorrelated based on the distance parameter. For example, when $d_r > 1$, then the audio signals could be decorrelated, so that increasing distance causes increased decorrelation. The decorrelator that is used could be a simple one such as different delays and/or phase modifications at different frequencies, or a more complex one, such as an artificial reverberator. The amount of decorrelation can be controlled by fully decorrelating the audio signals, and combining the non-decorrelated and decorrelated versions of the audio signals with different gains to obtain the processed audio signals. in some examples the ratio values can be modified based on the distance parameter, so that ratio values are shifted towards zero when distance becomes larger.

In some examples, the positioning of the direct and ambient components could differ from each other. For example, the direct portion could be panned at a first angular span, and the ambience at a second (overlapping or non-overlapping) angular span. In that case, the re-panning matrix P could be formulated so that the angular spans of the direct and ambient parts are combined to one larger span, and then the re-panning matrix is formulated based on that larger angular span.

In some examples, the metadata could also be modified in order to position the direct and the ambient components to different directions. For example, different modified azimuth angles could be determined for the direct and the ambient parts, $\theta_{mod,dir}(k,n)$ and $\theta_{mod,ambi}(k,n)$, based on the respective angular spans of the direct and the ambient parts. Then, these could be combined into a single modified azimuth angle $\theta_{mod}(k,n)$ in such a way that the modified azimuth angle of the direct part $\theta_{mod,dir}(k,n)$ is used more prominently when the energy ratio r(k,n) has a large value and the modified azimuth angle of the ambient part $\theta_{mod,amb}(k,n)$ is used more prominently when the energy ratio r(k,n) has a small value. The combination could be performed by converting the azimuth values to vectors, weighting them based on the ratio parameter, summing the weighted vectors, and determining the combined azimuth angle as the direction of the resulting vector or by any other suitable process.

FIG. 8 schematically illustrates an apparatus 507 that could be used to implement examples of the disclosure. The apparatus 507 comprises at least one processor 803 and at least one memory 805. It is to be appreciated that the apparatus 507 could comprise additional components that are not shown in FIG. 1. The apparatus 507 could be provided within a server 403 as shown in FIG. 4 or within any a playback device 109 or within any suitable device.

In the example of FIG. 8 the apparatus 507 comprises a processing apparatus. The apparatus 507 can be configured to process spatial audio data. The apparatus 507 can be configured to process spatial audio data for use in teleconferencing or mediated reality or any other suitable purpose.

In the example of FIG. 8 the implementation of the apparatus 507 can be as processing circuitry. In some examples the apparatus 507 can be implemented in hardware alone, have certain aspects in software including firmware alone or can be a combination of hardware and software (including firmware).

As illustrated in FIG. 8 the apparatus 507 can be implemented using instructions that enable hardware functionality, for example, by using executable instructions of a computer program 807 in a general-purpose or special-purpose processor 803 that can be stored on a computer readable storage medium (disk, memory etc.) to be executed by such a processor 803.

The processor 803 is configured to read from and write to the memory 805. The processor 803 can also comprise an output interface via which data and/or commands are output by the processor 803 and an input interface via which data and/or commands are input to the processor 803.

The memory 805 is configured to store a computer program 807 comprising computer program instructions (computer program code 809) that controls the operation of the apparatus 507 when loaded into the processor 803. The computer program instructions, of the computer program 807, provide the logic and routines that enables the apparatus 507 to perform the methods illustrated in FIG. 2. The processor 803 by reading the memory 805 is able to load and execute the computer program 807.

The apparatus 507 therefore comprises: at least one processor 803; and at least one memory 805 including computer program code 801, the at least one memory 805 and the computer program code 809 configured to, with the at least one processor 803, cause the apparatus 507 at least to perform:
  receiving 201 a plurality of spatial audio streams wherein the spatial audio streams comprise one or more audio signals and associated spatial metadata;
  obtaining 203 repositioning information relating to at least one of the plurality of spatial audio streams; and
  repositioning 205 the at least one of the plurality of spatial audio streams based on the repositioning information.

As illustrated in FIG. 8 the computer program 807 can arrive at the apparatus 507 via any suitable delivery mechanism 801. The delivery mechanism 801 can be, for example, a machine-readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 807. The delivery mechanism can be a signal configured to reliably transfer the computer program 807. The apparatus 507 can propagate or transmit the computer program 807 as a computer data signal. In some examples the computer program 807 can be transmitted to the apparatus 507 using a wireless protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol.

The computer program 807 comprises computer program instructions for causing an apparatus 507 to perform at least the following:
  receiving 201 a plurality of spatial audio streams wherein the spatial audio streams comprise one or more audio signals and associated spatial metadata;
  obtaining 203 repositioning information relating to at least one of the plurality of spatial audio streams; and
  repositioning 205 the at least one of the plurality of spatial audio streams based on the repositioning information.

The computer program instructions can be comprised in a computer program 807, a non-transitory computer readable medium, a computer program product, a machine readable medium. In some but not necessarily all examples, the computer program instructions can be distributed over more than one computer program 807.

Although the memory 805 is illustrated as a single component/circuitry it can be implemented as one or more separate components/circuitry some or all of which can be integrated/removable and/or can provide permanent/semi-permanent/dynamic/cached storage.

Although the processor 803 is illustrated as a single component/circuitry it can be implemented as one or more separate components/circuitry some or all of which can be integrated/removable. The processor 803 can be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" can refer to one or more or all of the following:
  (a) hardware-only circuitry implementations (such as implementations in only analog and/or digital circuitry) and
  (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions and
  (c) hardware circuit(s) and or processor(s), such as a microprocessor(s) or a portion of a microprocessor(s), that requires software (e.g. firmware) for operation, but the software might not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in FIG. 2 can represent steps in a method and/or sections of code in the computer program 807. The illustration of a particular order to the blocks does not necessarily imply that there is a required or preferred order for the blocks and the order and arrangement of the block can be varied. Furthermore, it can be possible for some blocks to be omitted.

In the example of FIG. 8 the apparatus 507 is shown as a single entity. In other examples the apparatus 507 could be provided a plurality of different entities that could be distributed within a cloud or other suitable network.

It is to be appreciated that variations of the above-described examples could be made in examples of the disclosure. For instance, in the example of FIG. 4 the system 401 comprises a centralized server 403. Other architectures for the system could be used in other examples. For instance, the system 401 could be a decentralized conferencing system 401 which does not comprise a centralized server 403. In such examples each of the participating devices can receive the spatial audio signals from the other participating devices. In such cases the participating devices, such as the playback devices 109 can be configured to obtain repositing information 511 and use this to reposition the received spatial audio streams.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
at least one processor; and
at least one memory storing instructions that, when executed with the at least one processor, cause the apparatus at least to:
receive a plurality of spatial audio streams, wherein the spatial audio streams comprise one or more audio signals and associated spatial metadata, wherein the plurality of spatial audio streams comprise, at least, a first audio stream captured from a first audio scene and a second audio stream captured from a second audio scene, wherein the first audio scene is at least partially different from the second audio scene;
obtain repositioning information relating to at least one of the plurality of spatial audio streams; and
reposition the at least one of the plurality of spatial audio streams based on the repositioning information.

2. An apparatus as claimed in claim 1, wherein repositioning the at least one of the plurality of spatial audio streams comprises the instructions, when executed with the at least one processor, cause the apparatus to:
modify at least one audio signal of the one or more audio signals comprised by the at least one of the plurality of spatial audio streams; and modify spatial metadata associated with the at least one audio signal.

3. An apparatus as claimed in claim 1, wherein repositioning the at least one of the plurality of spatial audio streams comprises the instructions, when executed with the at least one processor, cause the apparatus to:
modify two or more of the one or more audio signals comprised by the at least one of the plurality of spatial audio streams, wherein the one or more audio signals comprise at least two audio signals;
combine the two or more modified audio signals;
modify spatial metadata associated with the two or more modified audio signals; and
combine the modified spatial metadata.

4. An apparatus as claimed in claim 2, wherein the at least one memory stores instructions that, when executed with the at least one processor, cause the apparatus at least to:
combine the at least one modified audio signal with one or more unmodified audio signals; and
combine the modified spatial metadata with unmodified spatial metadata associated with the one or more unmodified audio signals.

5. An apparatus as claimed in claim 1, wherein the at least one memory stores instructions that, when executed with the at least one processor, cause the apparatus at least to:
reposition at least one of the plurality of spatial audio streams to cause a first audio stream to be repositioned and a second audio stream to be unmodified.

6. An apparatus as claimed in claim 1, wherein the at least one memory stores instructions that, when executed with the at least one processor, cause the apparatus at least to:
reposition at least one of the plurality of spatial audio streams to cause a first audio stream to be positioned in a first direction and a second audio stream to be positioned in a second direction.

7. An apparatus as claimed in claim 1, wherein the at least one memory stores instructions that, when executed with the at least one processor, cause the apparatus at least to:
reposition at least one of the plurality of spatial audio streams to enable a user to differentiate between a first audio stream and a second audio stream.

8. An apparatus as claimed in claim 1, wherein the obtained repositioning information comprises a mapping between directions of the plurality of spatial audio streams and a desired direction for the plurality of spatial audio streams.

9. An apparatus as claimed in claim 1, wherein the at least one memory stores instructions that, when executed with the at least one processor, cause the apparatus at least to:
reposition the plurality of spatial audio streams to manipulate directional parameters of the plurality of spatial audio streams.

10. An apparatus as claimed in claim 1, wherein the spatial metadata, respectively comprised by the spatial audio streams of the plurality of audio streams, comprises, for one or more frequency sub-bands, information indicative of:
a sound direction, and
sound directionality.

11. An apparatus as claimed in claim 1, wherein the at least one memory stores instructions that, when executed with the at least one processor, cause the apparatus at least to:
reposition the plurality of spatial audio streams to reposition sound direction components, and modify sound directionalities, of the spatial metadata respectively comprised by the spatial audio streams of the plurality of audio streams.

12. An apparatus comprising:
at least one processor; and
at least one memory storing instructions that, when executed with the at least one processor, cause the apparatus at least to:
receive a plurality of spatial audio streams, wherein the spatial audio streams comprise one or more audio signals and associated spatial metadata;
obtain repositioning information relating to at least one of the plurality of spatial audio streams;
determine modified directions for at least a first plurality of spatial audio streams and a second plurality of spatial audio streams, wherein the modified directions are determined based on the obtained repositioning information;
use the modified directions to reposition sound direction components of the spatial metadata;
determine modified sound directionality parameters based on direct-to-total energy ratios and the obtained repositioning information
use the modified direct-to-total energy ratios to reposition sound directionality components of the spatial metadata; and
reposition the plurality of spatial audio streams based, at least partially, on the repositioning information, to reposition the sound direction components and the sound directionality components of the spatial metadata.

13. An apparatus as claimed in claim 1, wherein the at least one memory stores instructions that, when executed with the at least one processor, cause the apparatus at least to:
apply an energy adjustment based, at least partially, on the repositioning of the at least one of the plurality of spatial audio streams.

14. An apparatus as claimed in claim 1, wherein the at least one memory stores instructions that, when executed with the at least one processor, cause the apparatus at least to:
combine the at least one repositioned spatial audio stream.

15. A method comprising:
receiving a plurality of spatial audio streams wherein the spatial audio streams comprise one or more audio signals and associated spatial metadata, wherein the plurality of spatial audio streams comprise, at least, a first audio stream captured from a first audio scene and a second audio stream captured from a second audio scene, wherein the first audio scene is at least partially different from the second audio scene;
obtaining repositioning information relating to at least one of the plurality of spatial audio streams; and
repositioning the at least one of the plurality of spatial audio streams based on the repositioning information.

16. A method as claimed in claim 15, wherein the repositioning of the at least one of the plurality of spatial audio streams comprises:
modifying at least one audio signal of the one or more audio signals comprised by the at least one of the plurality of spatial audio streams; and
modifying spatial metadata associated with the at least one audio signal.

17. A non-transitory computer-readable medium comprising program instructions stored thereon for performing at least the following:
receiving a plurality of spatial audio streams wherein the spatial audio streams comprise one or more audio signals and associated spatial metadata, wherein the plurality of spatial audio streams comprise, at least, a first audio stream captured from a first audio scene and a second audio stream captured from a second audio scene, wherein the first audio scene is at least partially different from the second audio scene;

obtaining repositioning information relating to at least one of the plurality of spatial audio streams; and repositioning the at least one of plurality of the spatial audio streams based on the repositioning information.

18. A method as claimed in claim 15, wherein the repositioning of the at least one of the plurality of spatial audio streams comprises:

modifying two or more of the one or more audio signals comprised by the at least one of the plurality of spatial audio streams, wherein the one or more audio signals comprise at least two audio signals;

combining the two or more modified audio signals;

modifying spatial metadata associated with the two or more modified audio signals; and combining the modified spatial metadata.

19. A method as claimed in claim 16, further comprising:

combining the at least one modified audio signal with one or more signal unmodified audio signals; and combining the modified spatial metadata with unmodified spatial metadata.

20. The apparatus as claimed in claim 1, wherein the first audio scene comprises one or more first sound sources that are reproducible in one or more first positions, wherein the second audio scene comprises one or more second sound sources that are reproducible in one or more second positions, wherein at least one of the one or more first sound sources, when reproduced in at least one of the one or more first positions, at least partially overlaps with at least one of the one or more second sound sources when reproduced in at least one of the one or more second positions, wherein repositioning the at least one of the plurality of spatial audio streams comprises the at least one memory stores instructions that, when executed with the at least one processor, cause the apparatus at least to:

reposition the at least one of the plurality of spatial audio streams such that, during playback, the at least one of the one or more first positions is repositioned to prevent overlap of the at least one of the one or more first sound sources with the at least one of the one or more second sound sources.

* * * * *